United States Patent [19]

Stocker

[11] Patent Number: 4,738,155
[45] Date of Patent: Apr. 19, 1988

[54] SELF-CENTERING CONNECTOR FOR VEHICLE ACCELERATOR PEDAL MOUNTING LEVER

[75] Inventor: Raymond Stocker, West Bloomfield, Mich.

[73] Assignee: Ford Motor Company, Dearborn, Mich.

[21] Appl. No.: 941,870

[22] Filed: Dec. 15, 1986

[51] Int. Cl.⁴ ............................ F16C 1/10; F16B 3/00; F16L 41/00
[52] U.S. Cl. .................................... 74/501 P; 74/513; 74/501 R; 403/197; 403/353
[58] Field of Search ............ 74/501 R, 501 A, 501 D, 74/501 F, 512, 513; 403/197, 71, 353, 199, 122

[56] References Cited

U.S. PATENT DOCUMENTS

| | | | |
|---|---|---|---|
| 3,082,642 | 3/1963 | Hammerand | 74/501 R |
| 3,542,980 | 11/1970 | Hamilton | 403/197 |
| 3,836,269 | 9/1974 | Koscik | 403/197 |
| 3,955,441 | 5/1976 | Johnson | 74/501 R |
| 4,074,945 | 2/1978 | Kraus et al. | 403/197 |
| 4,266,439 | 5/1981 | Hayashi et al. | 74/501 R |
| 4,324,503 | 4/1982 | Sevrence | 74/501 D |
| 4,328,714 | 5/1982 | Spinosa et al. | 74/501 A |
| 4,333,361 | 6/1982 | Spease | 403/197 |
| 4,488,831 | 12/1984 | Waite | 74/501 R |
| 4,548,093 | 10/1985 | Nomura et al. | 74/501 R |
| 4,625,579 | 12/1986 | Spease | 74/501 R |

FOREIGN PATENT DOCUMENTS

| | | | |
|---|---|---|---|
| 2532381 | 3/1984 | France | 74/501 D |
| 866462 | 4/1961 | United Kingdom | 74/501 D |
| 1536661 | 12/1978 | United Kingdom | 74/501 D |

Primary Examiner—Gary L. Smith
Assistant Examiner—Vinh Luong
Attorney, Agent, or Firm—Robert E. McCollum; Clifford L. Sadler

[57] ABSTRACT

A connector for attaching a Bowden-wire cable assembly to a vehicle accelerator pedal mounting lever has a closed end needle-like or teardrop shaped nose portion closely hugging the cable assembly with only minimal clearance between to allow movement of the cable relative to the assembly, the outer periphery gradually increasing in radius to slowly blend to the diameter of a circumferential groove in the body portion having wall portions of a radial extent greater than the aperture in the lever within which it is to be inserted for snugly retaining the connector to the pedal mounting lever, and including a number of axially extending slots permitting collaspe of the grooved portion toward the center to permit insertion through the aperture and released to their free state to snugly straddle the wall of the lever defining the aperture receiving the connector, the needle-nose shaped end providing a self-centering action to the connector regardless of the misalignment of the axis of the cable assembly with respect to the lever aperture due to accelerator pedal mounting lever geometry.

3 Claims, 1 Drawing Sheet

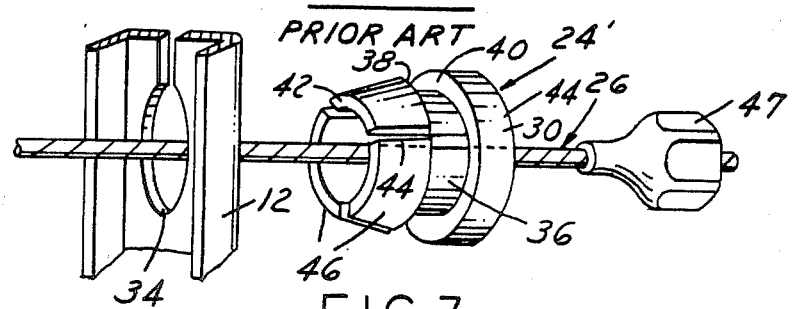
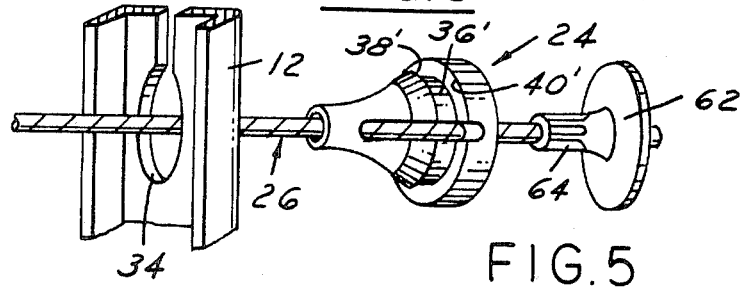
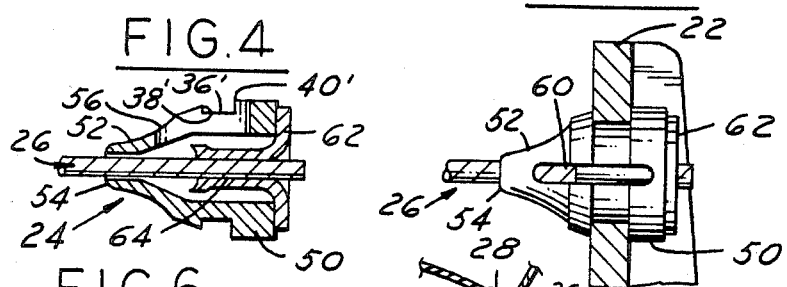
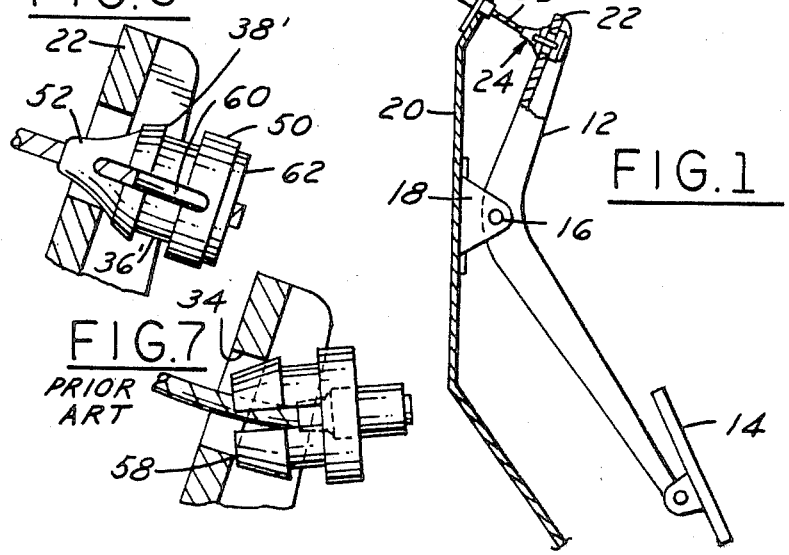

SELF-CENTERING CONNECTOR FOR VEHICLE ACCELERATOR PEDAL MOUNTING LEVER

This invention relates in general to a motor vehicle. More particularly, it relates to a self-centering connector for attaching the conventional carburetor throttle valve cable to the accelerator pedal mounting lever.

Connectors of the above-described type are well-known. However, in most instances, they are of the blunt, open-end type, such as is shown, for example, in FIG. 2 herein. The retainer is adapted to be inserted into a hole in the accelerator pedal lever and secured to the lever by means of a grooved keeper portion of the retainer. The insertion is made possible by the retainer having a number of axially extending, circumferentially separated, flexible finger-like elements that can be squeezed radially inwardly to pass through the hole and thereafter expand outwardly again to seat the hole defining portion of the lever in the groove. As can be seen from FIG. 2, however, the usual construction is a blunt, open end, which, as shown in FIG. 7, can become misaligned with the aperture and hang up on the hole edge. This results in a misadjustment of the length of the Bowden wire cable resulting in an inaccurate positioning of the vehicle accelerator pedal at engine idle speed positions and may be cause for inadvertent disconnection.

An example of the above-described prior art is the reference to Secord, U.S. Pat. No. 4,546,666, showing a connector similar to that illustrated in FIG. 2 herein. As seen in FIG. 3 of Secord, the connector has a blunt open end in which the finger-like portions can jam against the member 14 into which it is to be inserted and prevent proper entry. Other references showing similar constructions are those to Hamman, U.S. Pat. No. 4,304,148, Kraus et al, U.S. Pat. No. 4,074,945, Hoffmann et al, U.S. Pat. No. 3,768,115, Harper, U.S. Pat. No. 3,631,738 and De Swart, U.S. Pat. No. 2,559,759. The references for the most part show open blunt-end connectors. Hamman does show in FIGS. 4 and 5 an additional cap 110 that can be added to close off the end. However, this requires a three-part construction, which is unlike the invention to be described.

Norcross, U.S. Pat. No. 3,241,393 shows a non-blunt or ball-type end on the connector; however, it is a large bulbous type connected by a narrow neck portion to the main body.

It is an object of this invention to provide a connector of the type described that is of a one-piece simple construction, and is self-centering to prevent misalignment with the opening into which it is to be inserted. This is accomplished by providing a retainer or connector that has a rounded nose portion essentially of a teardrop shape that provides smooth entry into the aperture of the lever to which it is to be connected without a hangup on the edge of the lever aperture. The retainer is made of a soft plastic material that is flexible enough to glide smoothly and easily through the lever aperture even though the Bowden-wire cable to which it is attached may have its axis deflected by the accelerator pedal arm geometry.

Other objects, features and advantages of the invention will become more apparent upon reference to the succeeding, detailed description thereof, and by reference to the drawings illustrating the preferred embodiment thereof; wherein:

FIG. 1 is a side elevational view, with parts broken away and in section, of a vehicle accelerator pedal mounting lever installation embodying the invention:

FIG. 2 schematically illustrates a side elevational view of a known prior art type connector:

FIG. 3 schematically illustrates a side elevational view of a connector embodying the invention:

FIG. 4 is a cross-sectional view of the connector of FIG. 2.

FIG. 5 is a cross-sectional view of the pedal mounting lever within which is mounted the connector of FIGS. 3 and 4; and, FIGS. 6 and 7 are side elevational views similar to FIG. 4 illustrating the entry positions of the invention and the prior art connectors, respectively.

FIG. 1 illustrates schematically a motor vehicle accelerator pedal mounting lever assembly that includes a bell-crank lever 12 at the lower end of which is pivotally mounted the conventional accelerator pedal 14. The lever is hingedly mounted near its midpoint 16 to a bracket 18 projecting from the vehicle fire wall 20. It is apertured at its upper end 22 for insertion of the connector 24 for attaching a conventional stranded Bowden-wire type cable 26 to pedal mounting lever 12. The cable 26, in turn, is fed through fire wall 20 by means of a fitting 28 to be connected at its other end to a conventional carburetor throttle valve lever, not shown.

FIG. 2 shows a known type of connector 24'. It consists of a blunt nose one-piece hollow plastic body 30 with an outer periphery that tapers gradually in an axial direction towards the left, as seen in FIG. 2, for insertion through an opening 34 in the top of the mounting lever 12. The body 30 is provided with a circumferential groove 36 in its outer periphery with the walls of the groove being defined by shouldered portions 38 and 40 of differing radial extent. The base diameter of groove 36 is only slightly less than the diameter of aperture 34 in lever 12 so that when assembled to the mounting lever 12 in a manner similar to that shown in FIG. 5, the connector will be snugly retained by the lever 12.

The leftwardmost end 42 of body 30 in FIG. 2 ends abruptly in a blunt portion of a diameter less than that of aperture 34 in lever 12 to facilitate entry into the opening. The opposite end 44 of body 30 is of a diameter larger than that of aperture 34, as is also the outer edge of wall 38 of groove 36, so that the grooved portion will securely straddle the edge wall of aperture 34 when so assembled to the lever. To facilitate assembly to lever 12, the left-hand portion of body 30 is axially slotted at three equally circumferentially spaced portions 44 to define three flexible, deformable fingerlike elements 46. The circumferential clearances provided by the slots permit radial inward movement of the fingers upon their insertion through aperture 34 to a point permitting the edge wall 38 of groove 36 to clear the wall defining aperture 34 so that the groove 36 can be engaged by the wall.

Completing the construction, the Bowden-wire like cable 26 has attached at its end a pivot ball 47 of a larger diameter than the hollow opening at the righthand end portion 44 of body 30. It will be clear that leftward movement of cable 26 by, for example, a carburetor return spring, not shown, will cause leftward movement of the ball pivot 47 against connector 24', which then will move into the aperture 34 to be securely attached thereto in the manner previously described.

Turning now to the invention, FIGS. 3-6 show a body or connector 24 of a soft, resilient plastic material as having a body portion 50 integral with a closed end nose-like portion 52. The body portion includes an annular circumferential groove 36' defined by side walls 38' and 40' of differing radial extent, each greater than the diameter of the aperture 34 in mounting lever 12. In this case, the nose portion 52 has an end opening just enough to closely hug the cable assembly 26 at its leftward or forward end 54 with a minimal clearance therebetween sufficient only to permit passage of the cable relative to the nose portion. The nose portion 52 increases gradually in diameter as it progresses in an axial direction towards the rear of body portion 50 forming a teardrop or needlenose-like shape. This establishes a smooth curved outer guiding surface 56 for insertion through aperture 34 of lever 12 in a manner preventing a hang-up of the connector on an edge of the wall defining aperture 34. This is in contrast to the prior art type connector construction which, as clearly shown in FIG. 7, upon approach to the aperture 34, could be blocked by engagement of the blunt edge 58 of the connector 24' with the leading edge of the wall defining the aperture 34. As shown in FIG. 6, the gradually tapered closed end shape of nose portion 52 prevents such a hang-up on the edge of the aperture by smoothly guiding the connector through the opening. To further facilitate insertion of the connector groove through the opening, a number of axially extending circumferentially spaced slots 60 are provided in both body portion 50 and nose portion 52 which permits compression of the front wall portion 38' of groove 36' to pass through the aperture. Thereafter, the resiliency of the soft plastic will return the leading edge wall 38' to its original or free state, shown clearly in FIG. 5.

The Bowden-wire cable assembly 26 in the FIG. 3-6 embodiment is anchored to a disc 62 having a projecting sleeve portion 64. The latter is of a diameter providing an interference fit with the cable assembly 26 so as to be rigidly clamped to it, as seen clearly in FIG. 4. The outer diameter of disc 62 is larger than the right hand opening of body portion 50 to prevent leftward movement of the cable beyond the connector.

Briefly, in operation, the connector 24 is attached to lever 12 by the vehicle assembler first inserting cable 26 through the vertical slot connected to aperture 34 to the position shown in FIG. 3. The assembler then quickly depresses the accelerator pedal 14 with a rapid movement. This quickly moves end 22 of lever 12 rightwardly, as seen in FIGS. 1 and 3, to snap the connector 24 into opening 34, with the lever wall seated in groove 36. The nose portion 52 collapses at the groove wall, by reason of slots 60, to permit passage of edge wall 38' through the opening 34, whereupon it quickly returns to its former shape, securely locking the connector to lever 12.

From the foregoing, it will be seen that the invention provides a self-centering connector by reason of a closed end, needle or teardrop shaped nose portion of resilient material that gradually increases in radial extent to smoothly and assuredly guide the connector through the opening in the lever to which it is to be attached, even though the cable assembly to which it is attached may be misaligned because of pedal geometry.

While the invention has been shown and described in its preferred embodiment, it would be clear to those skilled in the arts to which it pertains that many changes and modifications may be made thereto without departing from the scope of the invention.

I claim:

1. Retaining means for securing one end of a movable motor vehicle throttle control cable assembly to a vehicle accelerator pedal lever, including in combination, a movable vehicle accelerator pedal lever having an aperture therein, a throttle control cable slidably mounted within the aperture for connection to the lever, and a self-centering tubular-like hollow retainer insertable through the lever aperture and receiving the cable therethrough, the retainer having an annular body portion having an annular groove in the outer periphery thereof, the lever having a wall portion defining the aperture and being receivable in the groove for securing the retainer to the lever against axial diaplacement relative thereto upon insertion of the retainer into the aperture, the retainer having a needlenose-like portion axially contiguous to the body portion and closed at one end except for an axial opening of a diameter sufficient only to permit the slidable passage of the cable therethrough, the needlenose-like portion having an outer curved periphery progressively increasing in radius upon increase in axial extent from the one end to the body portion to form a self-centering outer annular unbroken smooth guide surface from the cable at the one end to the body portion for smoothly guiding the body portion through the aperture in the lever, the wall portion having a diameter larger than the radially innermost diameter of the groove but smaller than the radially outermost diameter of the groove to axially retain the retainer within the groove and the cable to the lever, the body portion having further means permitting deformation of the body portion radially inwardly upon axial movement of the needlenoselike portion and body portion through the lever aperture to permit such movement and a seating of the wall portion of the lever snugly in the groove straddled by the side walls of the groove to axially retain the cable to the lever, and means adjacent and attached to the other end of the cable and engageable with the body portion to prevent axial movement of the cable towards the needlenoselike portion beyond a predetermined amount wherein the further means comprises at least one slot in the body portion.

2. A connector as in claim 1, wherein the slot extends axially for a considerable extent of the body portion.

3. A connector as in claim 1, wherein the further means includes a number of axially extending closed end slots circumferentially spaced from one another permitting the deformation of the body portion radially inwardly to permit passage of a portion thereof through the member aperture.

* * * * *